(12) United States Patent
Thoss

(10) Patent No.: US 12,481,551 B2
(45) Date of Patent: Nov. 25, 2025

(54) METHOD FOR ACCESSING A DATA BLOCK, STORED IN A MEMORY UNIT OF A COMPUTING UNIT, OF A NUMBER OF DATA BLOCKS

(71) Applicant: Robert Bosch GmbH, Stuttgart (DE)

(72) Inventor: Dieter Thoss, Fellbach-Oeffingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/749,984

(22) Filed: Jun. 21, 2024

(65) Prior Publication Data
US 2025/0004874 A1  Jan. 2, 2025

(30) Foreign Application Priority Data
Jun. 29, 2023  (DE) ............ 10 2023 206 140.6

(51) Int. Cl.
*G06F 11/10* (2006.01)

(52) U.S. Cl.
CPC ...... *G06F 11/1004* (2013.01); *G06F 11/1068* (2013.01)

(58) Field of Classification Search
None
See application file for complete search history.

(56) References Cited

U.S. PATENT DOCUMENTS

| | | | | |
|---|---|---|---|---|
| 5,809,228 A | * | 9/1998 | Langendorf | G06F 11/1056 714/763 |
| 8,176,382 B2 | * | 5/2012 | Hu | G06F 11/073 714/763 |
| 2009/0055906 A1 | * | 2/2009 | von Wendorff | G06F 12/1425 726/5 |
| 2012/0159283 A1 | * | 6/2012 | Lu | H03M 13/05 714/763 |
| 2012/0179869 A1 | | 7/2012 | Flynn et al. | |
| 2013/0159661 A1 | * | 6/2013 | Trimmer | G06F 12/1458 711/202 |
| 2020/0042725 A1 | * | 2/2020 | Bolkhovitin | G06F 21/64 |

(Continued)

OTHER PUBLICATIONS

V. B. Kleeberger, S. Rutkowski and R. Coppens, "Design & verification of automotive SoC firmware," 2015 52nd ACM/EDAC/IEEE Design Automation Conference (DAC), San Francisco, CA, USA, 2015, pp. 1-6, (Year: 2015).*

(Continued)

*Primary Examiner* — Daniel F. McMahon
(74) *Attorney, Agent, or Firm* — NORTON ROSE FULBRIGHT US LLP

(57) ABSTRACT

A method for accessing a data block, stored in a memory unit of a computing unit, of a number of data blocks. The method includes: activating a safe operating mode of the computing unit; in the safe operating mode of the computing unit, accessing the data block; if the access is a read access, reading data from the data block and subsequently writing the data into the data block; if the access includes a write access, reading first data from the data block, removing the first data from a check value associated with the data block, writing second data into the data block, adding the second data to the check value associated with the data block; and checking the check value associated with the data block.

14 Claims, 4 Drawing Sheets

(56) References Cited

U.S. PATENT DOCUMENTS

2024/0111629 A1\* 4/2024 Sforzin ............... G06F 11/1096
2024/0143495 A1\* 5/2024 Wan ..................... G06F 3/0659

OTHER PUBLICATIONS

D. Radanović, I. Kaštelan, M. Vidović and R. Prodanović, "One solution for persistent data storage in automotive industry," 2017 Zooming Innovation in Consumer Electronics International Conference (ZINC), Novi Sad, Serbia, 2017, pp. 56-59, (Year: 2017).\*

\* cited by examiner

METHOD FOR ACCESSING A DATA BLOCK, STORED IN A MEMORY UNIT OF A COMPUTING UNIT, OF A NUMBER OF DATA BLOCKS

CROSS REFERENCE

The present application claims the benefit under 35 U.S.C. § 119 of German Patent Application No. DE 10 2023 206 140.6 filed on Jun. 29, 2023, which is expressly incorporated herein by reference in its entirety.

FIELD

The present invention relates to a method for accessing a data block, stored in a memory unit of a computing unit, of a number of data blocks and to a computing unit and a computer program for carrying out the method.

BACKGROUND INFORMATION

A functionally safe execution platform (referred to, for example, as a safe island, vital modules, safe backbone, or safe execution platform) can be implemented in a computing unit such as a microcontroller or a system-on-a-chip (SoC) in order to make executing software at the highest safety level in terms of operational safety or functional safety possible. For example, in the automotive sector, this safety level can be ASIL-D, the highest safety requirement level for safety-relevant systems in motor vehicles according to the ISO 26262 safety standards or the ASILs (automotive safety integrity levels) defined therein.

Such a functionally safe execution platform can be realized, for example, by providing two identical processor cores and operating them in the so-called lockstep method, wherein the two cores execute the same processes and check the plausibility of their results against one another, and wherein an error signal can be output if deviations are detected. The cores usually have separate timing trees and separate regions on the corresponding chip. For example, program code can be stored in an embedded NOR flash memory, and data can be stored in an embedded static ROM memory.

However, such a lockstep concept with an additional, redundant processor core is associated with high energy consumption and a high space requirement. Furthermore, the lockstep concept cannot be implemented equally well for all processor types. For example, the lockstep concept can be well suited for medium-performance cores, which are, for example, used for engine control or for controlling brake systems in vehicles. However, at higher performance levels, the lockstep method often scales poorly. High-performance cores can often only be operated to a limited extent in parallel lockstep mode. Moreover, NOR flash memories often cannot be scaled to nodes below 28 nm and require more surface area than NAND flash. Embedded static RAM can usually comprise no more than 10 MiB (mebibytes).

Functionally safe execution platforms based on the lockstep principle are therefore often only suitable to a limited extent for systems with large program code and large amounts of data, as is the case, for example, in the course of autonomous driving.

SUMMARY

The present invention relates to a method for accessing a data block, stored in a memory unit of a computing unit, of a number of data blocks and to a computing unit and a computer program for carrying out the method. Advantageous embodiments of the present invention are disclosed herein.

The present invention makes it possible to be able to access data in the computing unit in a safe manner in terms of operational safety or functional safety. When safety or safe is mentioned in the present context, this is to be understood in particular in the sense of operational safety or functional safety, which is referred to as safety, in contrast to information technology security or information security, which is referred to as security.

According to an example embodiment of the present invention, the memory unit of the computing unit is in particular a non-volatile memory unit, e.g., a (NAND) flash memory. Each data block of the number of data blocks has a specified or specifiable number of bytes in each case. Particularly expediently, each data block of the number of data blocks is assigned a corresponding check value, and the number of data blocks is stored together with the corresponding number of check values in the memory unit.

Within the scope of the present method, a safe operating mode of the computing unit is activated or the computing unit is operated in a safe operating mode. For example, an activation instruction for activating this safe operating mode can be read and executed by a processor unit of the computing unit. In particular, the computing unit can thus switch from a normal, regular operating mode to the safe operating mode.

In the safe operating mode of the computing unit, a particular data block of the number of data blocks is accessed for reading and/or writing.

If the access is a read access, data are read from the data block and subsequently written into the data block. The check value associated with the data block is expediently not changed in the process. If the read data are falsified, for example while they are held in a register, this error is transferred into the data block by the writing process. This error can be discovered by checking the check value.

If the access comprises a write access, first data are read from the data block and the first data are removed from the check value associated with the data block. The check value is thus expediently changed depending on the first data. Furthermore, second data are written into the data block and the second data are added to the check value associated with the data block. The check value is thus expediently changed again depending on the second data. By changing the check value in this way, the access to the data block can be expediently traced or tracked. If the access is a write access, the second data may be independent of the first data, for example. If the access comprises a read and a write access, the first data may be processed into the second data, for example.

Furthermore, according to an example embodiment of the present invention, in the safe operating mode, the check value associated with the data block is checked. Particularly expediently, each check value stored in the memory unit is checked in the safe operating mode, in particular at least once. For example, the particular check value can be checked in the course of accessing the particular data block. In particular, the individual check values can also be carried out independently of or in addition to the accesses to the data blocks. For example, the check of the check values in the safe operating mode can be carried out as a separate routine or function, e.g., at specified points in time or in response to specified events or specified instructions.

An example embodiment of the present invention is based on providing specific, selected data or data blocks with a check value in each case so that these selected data can be accessed safely in the safe operating mode. By checking the check values, the individual data blocks can expediently be checked for correctness and integrity and errors in or manipulations of the individual data blocks can be detected. In the safe operating mode, access to erroneous or manipulated data can thus be prevented. If an error is detected in the course of the check value check, a specified measure can be carried out; for example, an error message can be output, or an entry can be created in an error memory, or the system can also be stopped or brought into a safe state where appropriate.

In particular, the computing unit can also be operated in a normal, regular operating mode, wherein, in this regular operating mode, the individual data blocks of the number of data blocks are also accessed for reading, but in particular independently of the particular check value of the individual data blocks or without the check values of the individual data blocks being checked. In this regular operating mode, the data blocks can thus, in particular, only be accessed in a regular, non-safe manner.

By checking the check values, it is in particular made possible to access the specified data blocks in an unsafe memory in a safe manner in the safe operating mode, wherein an unsafe memory is understood to be a normal, regular memory unit which is not protected by separate, additional measures. Since the specified number of data blocks can be accessed in a safe manner in the safe operating mode, these data blocks of the specified number of data blocks are also referred to in the present context as safe data or safe data blocks. Expediently, further data or data blocks for which no check value is determined can also be stored in the memory unit. Such data blocks are thus not part of the specified number of data blocks and are also referred to in the present context as normal data or normal data blocks. These normal data blocks can only be accessed in a normal, non-safe manner in both the regular operating mode and the safe operating mode.

Through the safe operating mode, a functionally safe execution platform (safe island, vital modules, safe backbone, or safe execution platform) can be implemented in a low-cost, energy- and space-saving manner. In the safe operating mode, it can be made possible to execute software at a high or highest safety level, for example at the highest safety requirement level ASIL-D according to the ISO 26262 safety standards in the automotive sector. In particular, no specific hardware units are required to realize the safe operating mode; conventional memory units and buses can be used, for example. Furthermore, it is in particular not necessary to implement error detection methods (error detection code, EDC) or error correction methods (error correcting code, ECC) in hardware. For example, a large external RAM memory can be used and connected to the processor unit via a conventional standard interface, e.g. via a JEDEC-LPDDR interface. Furthermore, a conventional external NAND flash can, for example, be used to write program code and initialization data into the RAM memory. The safe operating mode can expediently be activated and deactivated at any time as needed. Furthermore, the safe operating mode in particular does not require an embedded NOR flash memory or an embedded static ROM memory. Particularly expediently, it is made possible in the safe operating mode to detect errors in data paths, in a cache memory, and in a data memory within the CPU of the computing unit without additional hardware. Mixed safe and unsafe accesses, instructions and data with a defined interface can be provided. Protection of the specified number of data blocks from the compiler to the CPU can be made possible.

According to one example embodiment of the present invention, the check value is written into the memory unit of the computing unit if the access comprises a write access. The check value changed by removing the first data and adding the second data is thus stored together with the second data in the memory unit. The check value may, for example, be written into the memory unit in the course of the write access or also in a manner temporally decoupled from the write access. In the latter case, the check value may, for example, first be temporarily stored in a cache memory of the computing unit. For example, the check value may be changed accordingly and written into the memory unit when the cache memory is cleared.

According to one example embodiment of the present invention, a check value is in each case determined, or created, or assigned for the specified number of data blocks. Each of these data blocks has a corresponding specified or specifiable number of bytes. Each individual data block of the specified number of data blocks is in each case assigned an individual, unique check value. For example, the check values can each be calculated according to a cyclic redundancy check (CRC). The number of data blocks and the determined check values in each case of the individual data blocks are stored in the memory unit of the computing unit. These steps of determining the check values and storing the data blocks and the check values in the memory unit are carried out once, in particular at a first point in time, in particular before the computing unit is put into operation or before regular operation of the computing unit. These steps are expediently carried out by means of a compiler in the course of a compilation process. The data blocks can be accessed at a second point in time after the first point in time, in particular after the computing unit has been put into operation, in particular during the runtime of the computing unit.

According to one example embodiment of the present invention, an identifier or attribute is in each case added to a memory address of each data block of the number of data blocks, in particular in the course of the compilation process. These added identifiers can expediently be used to distinguish the specified number of safe data blocks from normal data blocks. When a pointer points to data at a particular memory address in the safe operating mode, the memory address can be used to detect whether the corresponding data are a normal data block or a safe data block. If the memory address has a particular identifier, the particular data block is expediently treated in a safe manner. For example, a specific bit in the memory address can have a specific value as a corresponding identifier. Expediently, the particular identifier is added to a virtual memory address of the particular data block. This virtual memory address is, for example, converted into a real, physical memory address by a memory management unit (MMU). In this way, there is in particular no restriction on a layout of the physical memory.

According to one example embodiment of the present invention, the number of data blocks is stored in at least one specified memory area of the memory unit at a first memory area address or starting at this first memory area address. The check values are stored in the at least one memory area at a second memory area address or starting at this second memory area address. Expediently, a first data block of the number of data blocks is stored at the first memory area address in the memory area. Each further data block is in each case expediently stored in the memory area with an offset in each case to the first memory area address. The first memory area address thus in particular points to this first data block. The second memory area address correspondingly expediently points to a first of the check values. The safe data blocks are thus stored in the memory unit in a fixed scheme with two characterizing memory addresses. In this way, access to the data blocks and checking the check values in the safe operating mode can be easily realized.

According to one example embodiment of the present invention, removing the first data from the check value associated with the data block comprises determining a first characteristic value of the first data, in particular a hash value. The check value is changed depending on the determined first characteristic value. For example, the first characteristic value can be subtracted from the check value.

According to one example embodiment of the present invention, adding the second data to the check value associated with the data block comprises determining a second characteristic value of the second data, in particular a hash value, and changing the check value depending on this second characteristic value. For example, the second characteristic value can be added to the check value.

By changing the check value in this way depending on the first or second characteristic value, every write access to the data block can in particular be traced or tracked. Such a first or second characteristic value is in particular unique for the particular first or second data. For example, the first or second characteristic value can in each case be determined individually for each byte of the particular first or second data.

According to one example embodiment of the present invention, in the safe operating mode, the particular data block is accessed by means of one or more instructions of different instruction categories. For example, individual instructions can each be assigned to a particular category through a corresponding specified value. Such instructions of different instruction categories in particular make it possible to access the safe data blocks in the safe operating mode in a safe manner.

By means of a write instruction of a first instruction category, data can be written into a data block of the specified number of data blocks without changing the check value associated with the particular data block. Furthermore, by means of this write instruction of the first instruction category, data can also be written into a normal data block to which no check value is assigned, i.e. into a data block that is not part of the specified number of data blocks. By means of a read instruction of the first instruction category, data can be read from a data block of the specified number of data blocks without changing the check value associated with the particular data block. Furthermore, by means of this read instruction, data can also be read from normal data blocks that are not part of the specified number of data blocks. These instructions of the first category may, for example, be regular read and write instructions, which are also used in the regular operating mode. By means of these instructions, data blocks are in particular accessed independently of the check values.

By means of a write instruction of a second instruction category, data can be written into a data block of the specified number of data blocks without changing the check value associated with the particular data block. By means of a read instruction of the second instruction category, data are read from a data block of the specified number of data blocks and the check value associated with the particular data block is changed in a first manner. By means of the instructions of this second instruction category, the specified number of safe data blocks is in particular accessed exclusively. In particular, if such an instruction of the second category points to a memory address of a normal data block, it will not be carried out.

By means of a write instruction of a third instruction category, data are written into a data block of the specified number of data blocks and the check value associated with the particular data block is changed in a second manner. By means of a read instruction of the third instruction category, data are read from a data block of the specified number of data blocks and the check value associated with the particular data block is changed in a third way. By means of the instructions of this third instruction category, the specified number of safe data blocks is in particular accessed exclusively. In particular, if such an instruction of the third category points to a memory address of a normal data block, it will not be carried out.

According to one example embodiment of the present invention, in the safe operating mode, reading and writing the data if the access is a read access, and reading the first data and writing the second data if the access comprises a write access are carried out according to a first time requirement. Changing the check value, i.e. removing the first data from the check value associated with the data block and adding the second data to the check value associated with the data block, takes place according to a second time requirement. In particular, a processing sequence for correspondingly changing the check value is created, and this processing sequence is processed according to the second time requirement. According to the first time requirement, the particular data are in particular accessed as immediately as possible or as quickly as possible with a small or minimal delay. According to the second time requirement, the check values are not necessarily changed immediately but can also be processed with a delay if necessary. In particular, changing a particular check value takes place according to the second time requirement before this check value is checked.

According to one example embodiment of the present invention, if the access comprises a write access, the check value associated with the data block is read and this read check value is stored together with information regarding the particular data block in a further memory unit, in particular in a volatile memory unit, in particular in a memory unit within the processor unit of the computing unit, in particular in a check value cache, in particular in a cache memory. The check value stored in this volatile memory unit can then be changed correspondingly, i.e. the first data are in particular removed from the check value stored in the volatile memory unit, and the second data are in particular added to the data block stored in the volatile memory unit. The correspondingly changed check value can be written from the volatile memory unit back into the memory unit. For example, the check values can be stored in the volatile memory unit together with the memory address of the particular data block, with an offset of the particular data block in the particular memory area of the memory unit, and with a memory address of the check value as the information regarding the particular data block. By storing the check values and the corresponding information, the check values can be processed in a simple and efficient manner according to the second time requirement.

According to one example embodiment of the present invention, a table is also created, in particular in the course of the compilation process, which table has a memory address of a first data block of the number of data blocks, e.g. the virtual memory address of the first data block, and also a memory address of a first check value, which is in particular stored directly behind a last data block of the number of data blocks. In the safe operating mode, accessing any data block of the number of data blocks comprises checking whether the memory address of the particular data block to be accessed is stored in the table. If this is the case, the particular data block is expediently accessed. If the memory address is not stored in the table, a specified measure can, for example, be carried out; for example, an error message can be output. The table can also be used if a particular check value is to be written into the volatile memory unit. For this purpose, it can be checked whether there is an entry for the particular data block in the table. If this is the case, the corresponding entry can be created in the volatile memory unit.

According to one example embodiment of the present invention, the check value associated with the data block is checked in response to a check instruction being called. In particular, only a single check value is checked in response to such a check instruction being called. Expediently, the check instruction is called repeatedly in order to check various check values one after the other, in particular until all check values have been checked. In particular, this repeated calling of the check instruction is carried out within a specified error detection time. Expediently, a check value check or integrity check thus takes place by means of the particular check instruction not each time safe data are accessed, but in particular only once within a specified error detection tolerance interval.

According to one example embodiment of the present invention, the check value associated with the data block is checked according to a specified frequency and/or according to a specified sequence. For example, it can thus be specified which of the data blocks will be checked next. Furthermore, individual data blocks can, for example, be checked more often, if necessary, than other data blocks. The frequency and sequence in each case can, for example, be specified by a user.

According to one example embodiment of the present invention, the computing unit has a plurality of hardware units and/or software units that can access the memory unit or the number of data blocks. This plurality of units is synchronized or process-synchronized with respect to read and write accesses to the number of data blocks. In this way, it can in particular be prevented that, during the check of a particular check value, data of the corresponding data block are changed.

According to one example embodiment of the present invention, the computing unit comprises a processor unit based on a RISC-V instruction set architecture (ISA). An instruction set generally refers to the totality of machine instructions that a processor unit can execute. The RISC-V instruction set architecture is based on the so-called RISC (reduced instruction set computer) principle, according to which the instruction set comprises a small number of instructions, usually fewer than 100, which can each be processed simply and quickly by the processor unit, whereby a simplified processor design, high processor clock speed and fast execution speed can be achieved in contrast to the so-called CISC (complex instruction set computing) architecture, which provides an instruction set with a high number of instructions (over 100), through which a particular processor can execute complex processes, which is however associated with a complex processor design. The RISC-V instruction set architecture is an open standard or open source and makes it possible in a simple manner to make changes and extensions to the instruction set. RISC-V processors or, in general, processors with a modifiable instruction set architecture are particularly expediently suitable for implementing the safe operating mode since instructions required to execute the safe operating mode, for example the read and write instructions of the different instruction categories, can be integrated into the instruction set in a simple manner.

The method is particularly preferably suitable for use in the automotive sector. The computing unit can in particular be designed as a microcontroller or control unit in a (motor) vehicle. For example, the method is particularly suitable for computing units with high-performance cores and for systems with large program code and large amounts of data, such as those used for autonomous driving. Processes executed by the computing unit can, for example, comprise safety-critical functions, which are performed for the safe operation and for the control of the vehicle, for example in the course of engine control, in the course of driving assistance functions, or also in the course of autonomous driving, etc. Safety or fail-safety and integrity of the control unit can be increased by the present method. In particular, the method can be used to meet safety requirements in the (motor) vehicle sector, such as those specified in the ISO 26262 standard or in particular by the so-called automotive safety integrity level (ASIL), a safety requirement level specified by ISO 26262 for safety-relevant systems in motor vehicles.

A computing unit according to the present invention, e.g., a control unit of a motor vehicle, is configured, in particular programmatically, to carry out a method according to the present invention.

Furthermore, the implementation of a method according to the present invention in the form of a computer program or computer program product having program code for carrying out all the method steps is advantageous because it is particularly low-cost, in particular if an executing control unit is also used for further tasks and is therefore present anyway. Finally, a machine-readable storage medium is provided with a computer program as described above stored thereon. Suitable storage media or data carriers for providing the computer program are, in particular, magnetic, optical, and electric storage media, such as hard disks, flash memory, EEPROMs, DVDs, and others. It is also possible to download a program via computer networks (Internet, intranet, etc.). Such a download can be wired or wireless (e.g., via a WLAN network or a 3G, 4G, 5G or 6G connection, etc.).

Further advantages and embodiments of the present invention can be found in the description herein and the figures.

The present invention is shown schematically in the figures on the basis of exemplary embodiments and is described below with reference to the figures.

DETAILED DESCRIPTION OF EXAMPLE EMBODIMENTS

Figure 1:
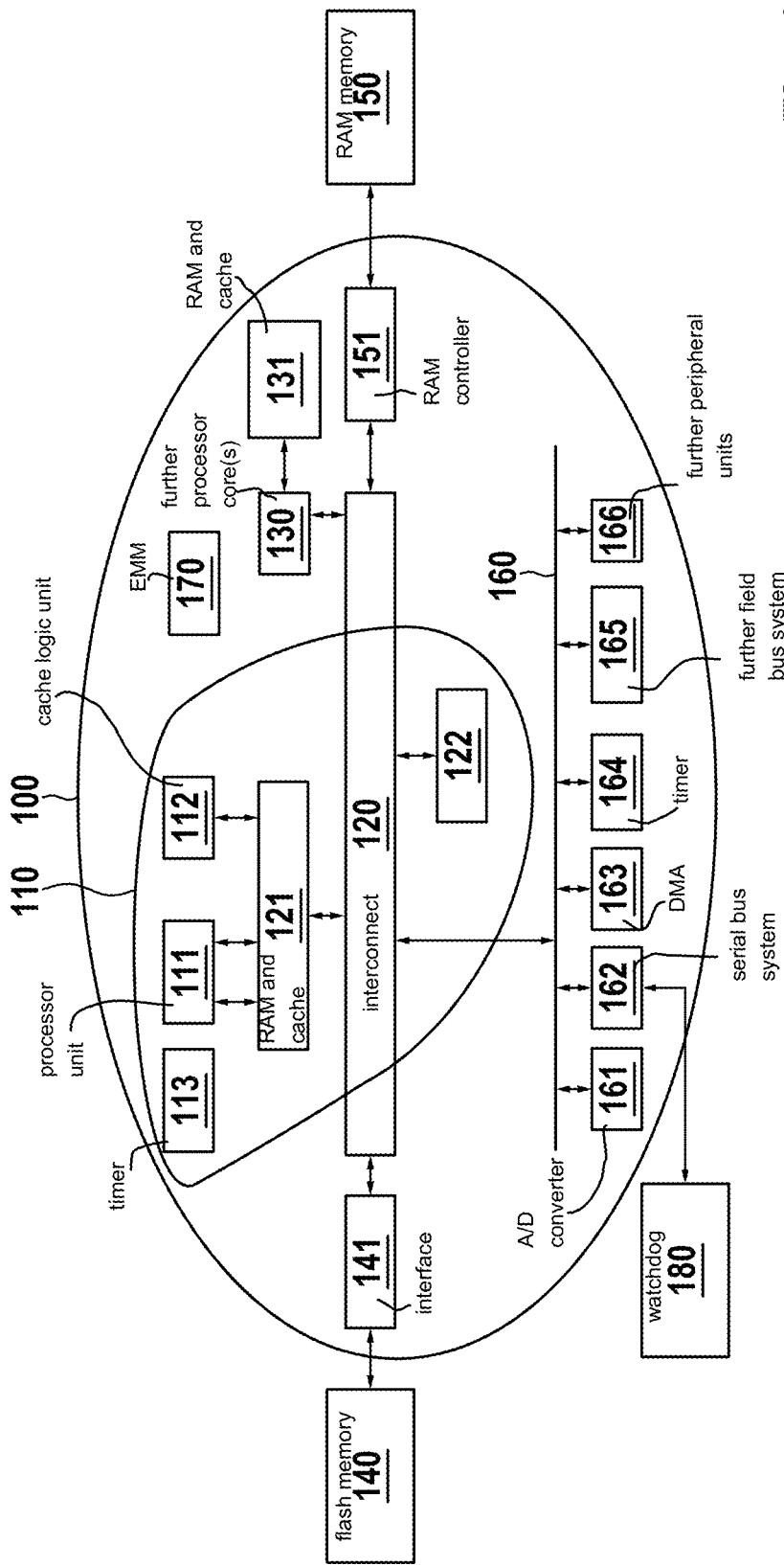
FIG. 1 schematically shows a computing unit configured to carry out an example embodiment of a method according to the present invention.

FIG. 1 schematically shows a computing unit, which is denoted by 100 and may, for example, be designed as a system-on-a-chip (SoC). For example, the SoC 100 may be provided for a motor vehicle and integrated in a control unit of the vehicle, for example in order to perform safety-critical functions for the safe operation of the vehicle, e.g. in the course of engine control, in the course of driving assistance functions, in the course of autonomous driving, etc.

In order to ensure the safety and integrity of the control unit, in order to be able to execute software at the highest safety level and meet safety requirements of the (motor) vehicle sector, in particular according to the ASIL-D safety requirement level of the ISO 26262 standard, the SoC 100 can be operated, according to an embodiment of a method according to the present invention, in a safe operating mode in which specific data can be accessed safely. In this way, a functionally safe execution platform 110 (safe island, vital modules, safe backbone, or safe execution platform) is realized in the SoC 100.

In the example shown, a processor unit 111, a cache logic unit 112 and a timer 113 are provided for this functionally safe execution platform 110 or for executing the safe operating mode. The processor unit 111 may expediently (but not restrictively) be a processor core based on a RISC-V instruction set architecture. This RISC-V processor 111 and the cache logic unit 112 are, for example, connected as further elements of the functionally safe execution platform 110 via RAM and cache memories 121 to an interconnect 120 of the SoC 100. For example, a flash memory unit 140, e.g. a NAND flash memory, can be connected to the interconnect 120 via an interface 141, and a RAM memory unit 150, e.g. an LPDDR RAM, can be connected via a RAM controller 151. The SoC 100 can furthermore comprise one or more further processor cores 130 with associated RAM and cache memories 131, which are connected to the interconnect 120. Furthermore, a memory unit 122 as a further element of the functionally safe execution platform 110 for a start process (boot flash memory) and a peripheral bus 160 can be connected to the interconnect 120. A large number of peripheral units, e.g. an analog-digital converter 161, a serial bus system 162 (serial peripheral interface, SPI), a unit for direct memory access 163 (DMA), a timer 164, and a further field bus system 165, e.g. a FlexRay field bus, can be connected to the peripheral bus 160. It is understood that fewer or even further peripheral units may also be provided, as indicated by reference sign 166. For example, an external monitoring unit 180 (watchdog) for detecting and managing an error or a failure of the SoC 100 may be connected via the serial bus system 162. Furthermore, the SoC 100 can have an error management module 170 (EMM) for managing output error messages.

Figure 2:
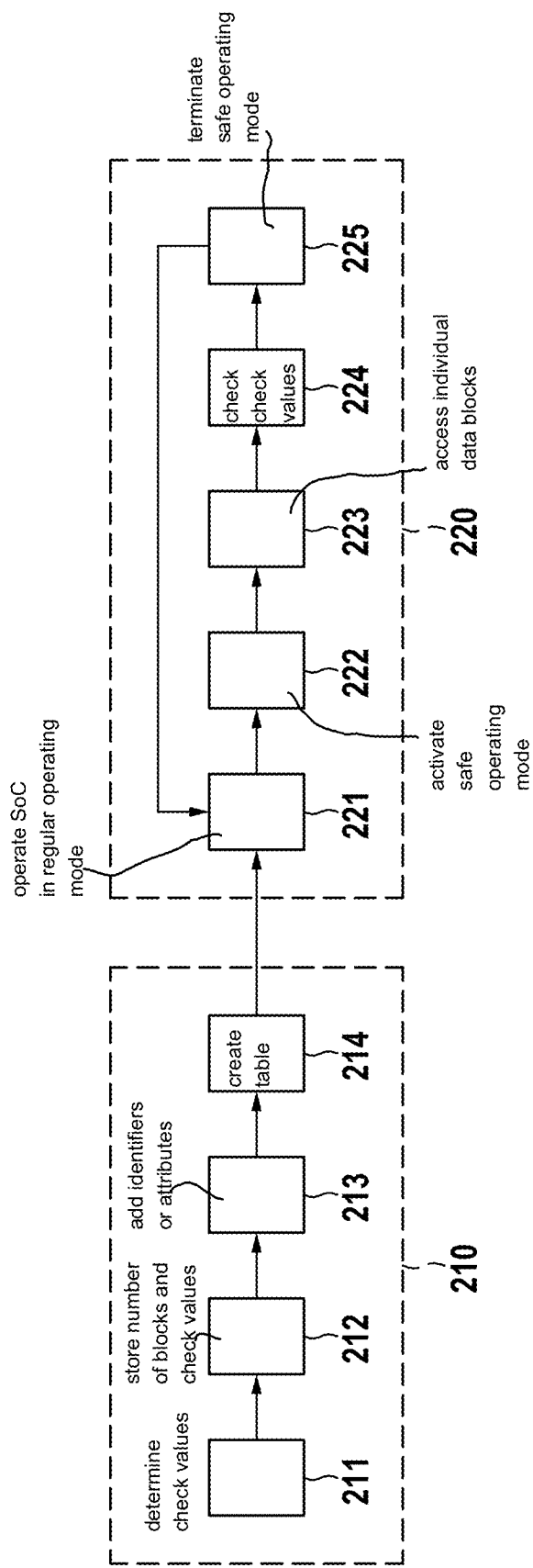
FIG. 2 schematically shows an example embodiment of a method according to the present invention as a block diagram.

FIG. 2 shows an embodiment of a method according to the present invention as a schematic block diagram.

First, a compilation process 210 is carried out by a compiler, in the course of which executable code and data are generated for and stored in the SoC 100. At a later point in time, the SoC 100 is put into operation and, during the runtime 220, can access the data stored in the course of the compilation process 210.

In the course of the compilation process 210, in a step 211, a check value is in each case determined for a specified number N of data blocks and, in a step 212, the number of data blocks and the determined check values in each case are stored in a memory unit of the SoC 100, e.g. in the flash memory unit 140.

In a step 213, an identifier or attribute is in each case added to a virtual memory address of each data block of the number of data blocks.

In a step 214, a table is created, in which a memory address, for example the virtual memory address, of the first data block of the number of data blocks is in each case stored. Below, this table is also referred to as the safe data table.

Since each data block is thus protected by a corresponding check value, these data blocks of the specified number of data blocks are also referred to as safe data or safe data blocks. Furthermore, in the course of the compilation process, further data blocks, for which no check value is determined, can also be stored into the memory unit 140. In the present context, such data blocks are also referred to as normal data or normal data blocks. After the SoC 100 is put into operation, it can be operated in a regular operating mode and in a safe operating mode during its runtime 220. In the regular operating mode, both the normal data and the safe data are accessed in the same normal manner. In the safe operating mode, the normal data blocks are likewise accessed in this normal manner. In the safe operating mode, the safe data blocks are in particular accessed in a different, safe manner, expediently by means of instructions of specific instruction categories.

The determined check values are in particular used to detect errors but not to correct errors. Without a correction function, the check values can be provided in a very memory-efficient manner. For example, a check value with a number $B_{check}$ of bits can be used to protect a data block with $N_{block}$ bytes. In particular, $N_{block}$ is a power of 2 and may, for example, be in the range between about 256 and 16384. The smaller the value of $N_{block}$ is, the faster the check of the particular check value can be carried out and the shorter can be the time for which the corresponding data are blocked from other accesses. The larger the value of $N_{block}$ is, the less storage effort is required for the check values and the less frequently a check value check can be carried out. Expediently, the value $N_{block}$ can be set with a compiler option by a user.

In particular, the check values are not visible to a programmer and cannot be legally retrieved. For a .data segment, the compiler can expediently allocate the necessary space to the check values and initialize them automatically. At the beginning of the runtime 220, these initialized data are copied by the startup code from the read-only memory 140 into the read/write memory, e.g. 150. For a .bss (block start by signal) segment, this allocation likewise expediently takes place by means of startup code. For a heap and stack memory, the allocation is expediently carried out by an allocation function of a library during the runtime.

The added identifier can be used to distinguish the safe data from the normal data. If the particular virtual memory address has a particular identifier, the corresponding data are treated safely in the safe operating mode. Normal data, whose virtual memory address does not have such an identifier, are accessed in the same conventional manner in the safe operating mode and in the regular operating mode.

For example, as such an identifier, a specific bit in the virtual memory address can have a specific value. If, for example, a most significant bit (MSB) in the virtual memory address has the value '0', the data block may be a normal data block. If the MSB bit in the virtual memory address has the value '1', the data block may, for example, be a safe data block.

Furthermore, the identifier can also be added, for example, in a series of areas or segments of the virtual memory address. For example, $\log_2 (N_{block})$ LSBs (least significant bits) can be neglected since safe data blocks expediently always start at a boundary of a block with $N_{block}$ bytes.

For example, the number of data blocks is stored in at least one specified memory area of the memory unit 150 at a first memory area address $A_{block}$ or starting at this first memory area address. The check values are stored in the at least one memory area at a second memory area address $A_{check}$ or starting at this second memory area address.

The first memory area address $A_{block}$ thus in particular points to a first data block of the N data blocks. The second memory area address $A_{check}$ in particular points to a first check value, which in particular follows a last one of the N data blocks.

A data block expediently always starts with an integer multiple of the block size $N_{block}$. This means that the $\log_2 (N_{block})$ LSB bits of $A_{block}$ and $A_{check}$ are 0.

The following in particular applies to the number of data blocks:

$$N = (A_{check} - A_{block}) \gg \log_2 (N_{block})$$

In particular, the data blocks each start at:
<memory address>&~($N_{block}$−1)

An offset of a particular data block to the first memory address is given by:
(<memory address>−$A_{block}$)

The check value associated with a particular data block is in particular stored at:

$$A_{check} + ((\text{memory address} - A_{block}) \gg (\log_2 (N_{block}) - \log_8 (B_{check})))$$

Corresponding calculations may, for example, be implemented in hardware in a simple manner.

The individual safe data blocks can each be safe initialized data, safe non-initialized or uninitialized data, safe heap data or data in a heap data structure, or safe stack data or data of a stack or stack memory data structure.

Safe initialized data are in particular located in the .data segment. They take up space in the executable binary file. Since the virtual memory addresses of the safe data each have the specific identifier, they are placed in an additional segment in order to be able to meet this criterion. The compiler initializes these safe data and their check values. The compiler also generates an entry for the safe data table.

The safe non-initialized data are in particular located in the .bss segment. These data are in particular each all zero and do not take up any space in the executable binary file. Startup code reserves space on the heap and initializes the check values. This memory space meets the criteria for safe data, i.e. the corresponding virtual memory addresses each have a corresponding identifier. The addresses for accessing these data are generated by the compiler and are moved into this area. The compiler may also generate fixed addresses, and the reserved area can be mapped to the existing physical memory by a memory management unit (MMU). The startup code also generates an entry for the safe data table.

The data of the heap data structure are, for example, reserved in a safety memory library by memory management calls during the runtime 220. For the safe operating mode, the compiler generates calls to this safety memory library, which provides addresses to safe data. For example, the safety memory library also reserves space for the check values and arranges the safe data in blocks. For the regular operating mode, the compiler generates standard calls in a standard memory library, which provides addresses to normal data without a check value. The safety memory library also updates the safe data table.

Safe stack data are, for example, treated like safe non-initialized data. The startup code, for example, reserves space on the heap and initializes the check values. This space meets the criteria for safe data, i.e. the corresponding virtual memory addresses each have a corresponding identifier. A stack pointer is, for example, set to behind this space in order to work downward. Since the safe stack data are in particular safe non-initialized data, no entry for the safe data table is required. Any number of stacks of any size can be reassigned at the start or during the runtime. When transitioning from the normal operating mode to the safe operating mode, the stack memory can be switched from normal data to safe data, and vice versa when returning. This can be done by the safety memory library.

The safe data blocks are thus stored in the memory unit 150 in one or more memory areas, each of which starts with a data block at the first memory area address $A_{block}$ and ends with the associated check value at the second memory area address $A_{check}$. Each of these safe memory areas is completely described with $A_{block}$ and $A_{check}$ and forms an entry in the safe data table.

The size of the generated table, i.e. the number of the safe memory areas, should be kept small. In particular, there is only one memory area in which all safe data are stored. This memory area is in particular large enough, e.g. several gigabytes, to receive all data that a program executed in the SoC 100 could ever request. In particular, at the start, only a small portion of this area is equipped with physical memory. The rest is only reserved and may never actually be allocated. Ideally, the table can contain only a few entries and is located within the processor unit 111. This makes a very quick search possible.

After the compilation process 210 is completed and the SoC 100 has been put into operation, the SoC 100 is first operated in the regular operating mode in a step 221 during its runtime 220. In a step 222, the safe operating mode is activated, e.g. by reading and executing an activation instruction.

In this safe operating mode, in a step 223, individual data blocks, stored in the memory unit 150, of the number of data blocks are accessed for reading and/or writing. In a step 224, the check values stored in the memory unit 150 are checked.

If the access to a particular data block is a read access, data are read from the data block and subsequently written into the data block without the check value associated with the data block being changed. If the access comprises a write access, first data are read from the data block and these first data are removed from the check value associated with the data block. Furthermore, second data are written into the data block and the second data are added to the check value associated with the data block. If the access comprises a read and write access, the first data are processed to form the second data, for example.

Thus, if the access to a particular safe data block comprises a write access, the check value associated with the data block is changed. For this purpose, a first characteristic value of the first data, in particular a first hash value, is in particular determined and the check value associated with the data block is changed depending on the first characteristic value. In particular, the first hash value is subtracted from the check value. Furthermore, a second characteristic value of the second data, in particular a second hash value, is in particular determined and the check value associated with the data block is changed depending on the second characteristic value. In particular, the second hash value is added to the check value.

Safe data blocks are accessed in the safe operating mode by means of instructions of different instruction categories.

The particular data blocks can be accessed according to a first time requirement, in particular as immediately as possible or with a small or minimal delay. For changing the particular check values, a processing sequence can be created, which is processed according to a second time requirement.

For example, a particular check value can be initialized together with the corresponding data block. An initial value of the check value can be any value. When accessing the particular data block, the corresponding check value can, for example, be changed by subtracting the hash value of each byte from the check value when loading and by adding the hash value of each byte to the check value when storing. In particular, the check value is practically never zero, in particular not even for data blocks with the value zero.

The hash value is, for example, calculated separately for each byte and can be up to $B_{check}$ bits long or shorter. For example, for each hash value, the corresponding offset (<memory address>-$A_{block}$) can be included. Without this address information, incorrect addressing could be overlooked. The use of this offset within the particular memory area is in particular transparent to the MMU and can avoid problems in the assignment of virtual to physical addresses.

For example, the hash value is calculated per byte and uses the address of the byte. For longer words with 16, 32, 64, . . . bits, the hash for each byte can be calculated simultaneously with 2, 4, 8, . . . hash units. The check value can be changed by means of their sum. Their sum can be added to the check value during a write access and be subtracted from the check value during a read access.

A corresponding hash algorithm for determining the hash values is in particular designed in such a way that the check value changes in more than 99% of all possible single- and multi-bit errors within the data block. This is in particular true for white noise, all 0s, all 1s, and all regular patterns with respect to data and/or address.

Since the offset results in a different value for each address, a corresponding hash value is expediently never zero. In particular, the hash value is always explicitly initialized, even for all data blocks with the value zero.

In order to change a particular check value depending on a particular characteristic value or hash value, the particular check value can be read from the memory unit 150 and stored in a check value cache, e.g. within the processor unit 111. In particular, the particular check value is stored in this check value cache together with information regarding the corresponding data block that is being accessed.

For example, as the particular information, the memory address of the associated data block can be stored in the check value cache, in particular without the lower $\log_2(N_{block})$ bits, which in particular are always zero. This address is the key for the check value cache to find a table entry. Furthermore, the address offset of the particular block to the first memory area address $A_{block}$, the current check value with $B_{check}$ bits, and the virtual address from where the check value is read and where the changed check value is stored are, for example, stored as information in the check value cache.

When a cache entry is deleted, only the correspondingly changed check value is stored into the memory unit 150. The rest of the entry is lost and is reconstructed when the particular check value is reloaded. For this purpose, the table generated in step 214 can be searched for an entry that matches the specified effective data address. If nothing is found, this is an addressing error and triggers an exception, for example. This is an additional control mechanism, which is expediently provided in the safe operating mode. The found entry is used to calculate the data block address, the offset to the first block, and the address of the check value. The particular check value is then loaded into the check value cache. Expediently, each time a check value cache entry is created, the table generated in step 214 is searched.

Through a large number of load and store accesses, a corresponding large number of requests for changing the particular check values can be generated. In particular, there is no need to delay a particular loading or storing process until the corresponding check value has been ascertained. Corresponding accesses can be carried out as quickly as possible according to the first time requirement.

A corresponding check value should accordingly be changed According to the second time requirement, in particular before its check, so that plenty of time can in particular be available to make the change. All requests to change the check values can therefore be fed as a separate processing path into the processing sequence.

For example, requests to ascertain a check value can be queued into the processing sequence. In the course of the processing, the hash value for each byte can then be calculated. The corresponding check value can be loaded into the cache if it does not exist there, possibly after storing another cache entry, and can then be changed by means of the calculated hash value.

In the safe operating mode, new or extended instructions may be available, in particular in comparison to the regular operating mode. In particular, the access to safe data relates to instructions that use an in particular extended loading/storing unit of the core. For example, all load and store instructions for signed and unsigned integers of any width, floating-point numbers of any accuracy, vectors of any size, and any other data, in particular excluding atomic instructions, can use an additional variable, e.g. a hint value, with, for example, three possible values. Through these three possible values, a distinction can in particular be made between three instruction categories. The hint value is expediently only taken into account in the safe operating mode. In the regular operating mode, a standard read or write instruction is, in particular, always used.

A first instruction category may, for example, be defined if no specific value is assigned to the hint variable ("no hint").

This first instruction category may in particular comprise a standard read and write instruction ("no hint load," "no hint store"). By means of this read or write instruction of the first instruction category, safe data blocks can be accessed accordingly without changing their check values. Furthermore, normal data can also be accessed by means of this read or write instruction.

A second instruction category may, for example, be defined by a first specific value of the hint variable, e.g. by the value "EXCL," and may, for example, relate to accesses exclusively or solely to safe data. By means of a write instruction of the second instruction category ("EXCL store"), only safe data blocks are in particular stored without changing their check values. By means of a read instruction of the second instruction category ("EXCL load"), only safe data blocks are in particular read and their check value in each case is changed in a first manner, e.g. by subtracting the hash value from the check value. The instructions in this second instruction category in particular do not lead to any action or are not executed if the corresponding memory address points to normal data.

A third instruction category may, for example, be defined by a second specific value of the hint variable, e.g. by the value "SAFE," and may, for example, likewise relate to accesses exclusively to safe data. By means of a write instruction of the third instruction category ("SAFE store"), only safe data blocks are in particular stored and their check value in each case is changed in a second manner, e.g. by calculating the current hash value and by adding this value to the check value in the cache. By means of a read instruction of the third instruction category ("SAFE load"), only safe data blocks are in particular read and their check value in each case is changed in a third manner, e.g. by calculating the current hash value and by subtracting this value from the check value in the cache.

The calculation of the hash value and the changing of the check value can be carried out in a delayed manner according to the second time requirement, while the next read or write instructions are already being executed, so that no speed impairment occurs.

In particular, a corresponding hint value can be integrated into all read and write instructions defined in the instruction set architecture. If this is not possible, for example because a code space is full, instruction categories can also be defined in other ways, e.g. by means of prefix instructions.

For example, for the safe operating mode, instead of a simple read instruction, the compiler can generate code from the following instructions: load data from the memory 150 by means of a read instruction of the first instruction category ("no hint load"); use the data without changing them; store the data in the memory 150 by means of a write instruction of the second instruction category ("EXCL store"). The corresponding check value is not changed in the process. If the data are falsified during loading and holding in a register, this error is transferred during the final storing into the memory 150 by means of the "EXCL store" instruction and is discovered the next time the corresponding check value is checked. In the regular operating mode or when loading normal data, the "EXCL store" instruction has no effect.

For example, for the safe operating mode, instead of a simple store instruction, the compiler can generate code from the following instructions: load first data by means of a read instruction of the second instruction category ("EXCL load"); store second data by means of a write instruction of the third instruction category ("SAFE store"). In particular, the "EXCL load" instruction only serves to subtract the hash of the old value, i.e. the first hash value of the first data, from the check value, wherein the target register may be x0, for example. The "SAFE store" instruction writes the new, second data and adds their new hash value, i.e. the second hash value of the second data, to the check value. In the regular operating mode, the "EXCL load" instruction has no effect and storing works normally.

For example, for the safe operating mode, the compiler can generate code from the following instructions if a value is to be loaded, changed and then stored again: load first data by means of a read instruction of the third instruction category ("SAFE load"); use and change the data, which in particular generates the second data from the first data; store the changed second data by means of a write instruction of the third instruction category ("SAFE store").

Furthermore, further instructions can also be used in both the regular operating mode and the safe operating mode. For example, a load and reserve instruction ("Load and Reserve") and a conditional store instruction ("Store Conditional") can be used for deadlock-free synchronization of a plurality of bus masters. These instructions can also be used in the safe operating mode. If these instructions address safe data, additional actions may, for example, be brought about. For example, the load and reserve instruction in the safe mode can establish a "reservation context" that also contains the hash value of the loaded value.

For example, in the safe operating mode, the conditional store instruction can add the hash value of the stored value minus the hash value in the reservation context to the check value.

Furthermore, it is, for example, possible to use atomic instructions which can carry out accesses to data without other processes being able to access these data during this access. For example, in the RISC-V ISA, these atomic instructions may comprise AMOSWAP, AMOADD, AMOAND, AMOOR, AMOXOR, AMOMAX, AMOMAXU, AMOMIN, AMOMINU (combination of the prefix AMO with a regular command SWAP, ADD, AND etc.). All of these instructions access data in an atomic, non-interruptible manner. These instructions can in particular also be used in the safe operating mode. If these instructions address safe data in the safe operating mode, the hash value of the stored value minus the hash value of the loaded value is added to the check value, for example.

Furthermore, a check value can be loaded from the check value cache into the target register by means of a safe check value load instruction ("SAFLDCHK"). For example, this SAFLDCHK instruction can be used for the stack memory, for checking the check values, and for debugging. If the particular check value is not present in the check value cache, it is loaded. If the check value cache is full, another check value is stored first.

Furthermore, a check value from a source register can be written into the check value cache by means of a safe check value write instruction ("SAFSTCHK"). This instruction can, for example, also be used for the stack memory, for checking the check values, and for debugging. If the particular check value is not present in the cache, it is loaded. If the check value cache is full, another check value is stored first.

Furthermore, all check values or else only certain check values can be cleared from the check value cache into the memory 150 by means of a flush instruction.

For example, in order to initialize a new data block, i.e. when the data block is allocated on the heap, the safety memory library can use the following sequence of instructions: create a check value cache entry and initialize the check values by means of a SAFSTCHK instruction; store all data in the data block by means of a "SAFE store" instruction. In particular, no gap will be left in the process.

For checking a single check value of the check values stored in the memory unit 150, a check instruction is called and executed. This check instruction can, for example, be implemented as a separate routine or function, e.g. by means of a checkwalk function that can be implemented in the safety memory library.

Based on the safe data table, each time the check instruction or the checkwalk function is called, a data block is compared to its check value. If they do not match, the function returns an error and the caller can decide how to respond.

Each call of the check instruction or the checkwalk function checks a data block, i.e. $N_{block}$ bytes. The larger $N_{block}$ is, the longer this may take. This is important because the data block and its check value must not change during the execution of the check instruction, otherwise a false error would be returned. On a system with only a single core, this could be caused by an interrupt. On a multi-core system, this can be caused by an interrupt or by another core. The user is responsible for avoiding such conflicts.

Since each call of the check instruction checks only one data block, many calls are required until all safe blocks of data are checked. This in particular happens within the error detection time.

The safety memory library can, for example, provide supporting functions and data, e.g. how often the check instruction should be called and which data block should be checked next. For example, it is thus possible to specify a sequence and a frequency according to which individual check values are checked. This makes it possible, for example, to check data blocks in a user-defined sequence or to check some data blocks more frequently than others. This can help the user to minimize access collisions and to optimize the system.

For checking a data block or a check value, the checkwalk function, for example, first reads the particular check value of the corresponding data block with a normal read instruction. Then, the function goes through the data block and reads it completely, e.g. by means of a "SAFE load" instruction. Finally, the check value should correspond to the init value of the check value. In order to be as fast as possible, the checkwalk can take place on a 32-bit architecture with 32-bit "SAFE load" instructions and on a 64-bit architecture with 64-bit "SAFE load" instructions.

While a check value is being checked, the data of the corresponding data block must not change. For this purpose, various hardware and/or software units of the SoC 100, which can each access the memory unit 150 or the safe data blocks stored there, are synchronized or process-synchronized with respect to read and write accesses to the safe data blocks.

If, for example, two non-process-synchronized cores, which are each in the safe operating mode, write different values to the same address in the memory 150, a particular first memory access could be overwritten by a particular second memory access, while the corresponding check value reflects both memory accesses. The next time the check value is checked, an error would then be detected.

Even a read access from non-process-synchronized cores could lead to such an error if the corresponding read access ends with an "EXCL store" instruction. If another non-process-synchronized core changes the particular data block during this read access, this change could be lost but would be contained in the check value. This would result in an error the next time the check value is checked.

Through the process synchronization of corresponding units, such errors can be avoided. For example, corresponding units can be synchronized by means of a mutex method or semaphore method.

In a step 225, the safe operating mode is terminated and the SoC 100 switches back to the regular operating mode. For example, the SoC 100 can switch to the regular operating mode in response to an interrupt instruction. When an interrupt instruction occurs, the CPU stores its context and switches to the regular operating mode, in particular including the stack memory. After the interruption, the context is restored.

Figure 3:
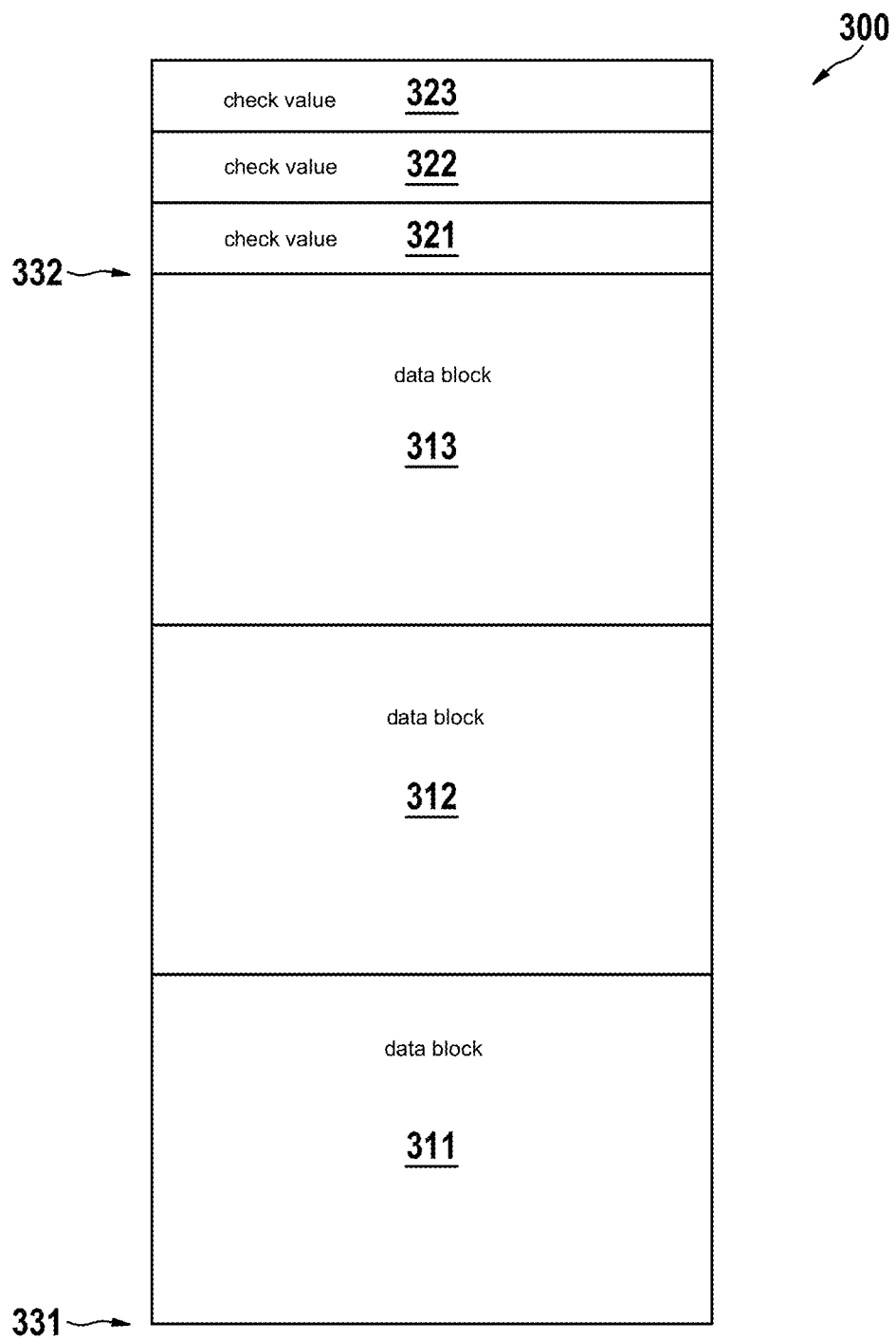
FIG. 3 schematically shows a memory unit of a computing unit configured to carry out an example embodiment of a method according to the present invention.

FIG. 3 schematically shows the memory unit 150 of the SoC 100. FIG. 3 shows, for example, a memory area 300 of the memory unit 150, in which three data blocks 311, 312, 313 and three associated check values 321, 322, 323 are stored. The first memory area address $A_{block}$, starting at which the three data blocks 311, 312, 313 are stored, is denoted by 331. The second memory area address $A_{check}$, starting at which the check values 321, 322, 323 are stored, is denoted by 332.

Figure 4:
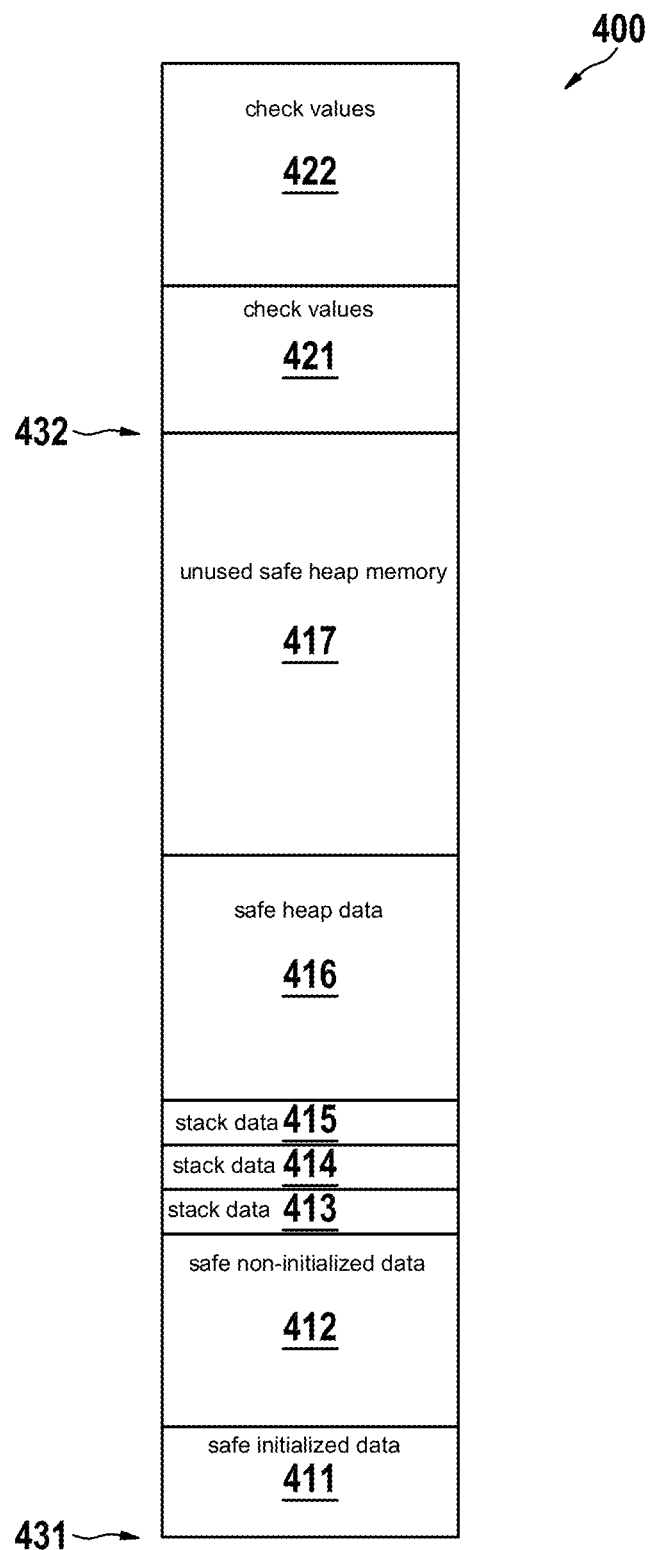
FIG. 4 schematically shows a memory unit of a computing unit configured to carry out an example embodiment of a method according to the present invention.

The memory unit 150 of the SoC 100 is also shown schematically in FIG. 4. FIG. 4 shows, for example, a memory area 400 of the memory unit 150, in which, starting at the first memory area address $A_{block}$ 431, safe initialized data 411, safe non-initialized data 412, safe stack data 413, 414, 415, safe heap data 416, and a reserved, unused safe heap memory 417 are provided. Starting at the second memory area address $A_{check}$ 432, the check values 421 for the initialized data 411, for the non-initialized data 412, for the stack data 413, 414, 415, and for the heap data 416 are stored. Furthermore, memory space is reserved for the check values 422 for the unused heap memory 417.

What is claimed is:

1. A method for accessing a data block of a number of data blocks, stored in a memory unit of a computing unit, the method comprising the following steps:
   activating a safe operating mode of the computing unit;
   accessing, in the safe operating mode of the computing unit, the data block;
   based on the access being a read access, reading data from the data block and subsequently writing the data into the data block;
   based on the access including a write access, reading first data from the data block, removing the first data from a check value associated with the data block, writing second data into the data block, adding the second data to the check value associated with the data block; and
   checking the check value associated with the data block.

2. The method according to claim 1, further comprising: based on the access including a write access, writing the check value into the memory unit of the computing unit.

3. The method according to claim 1, further comprising:
   determining a corresponding check value for each of the number of data blocks; and
   storing the number of data blocks and the corresponding determined check values in the memory unit of the computing unit.

4. The method according to claim 3, further comprising:
   adding a corresponding identifier to a memory address of each data block of the number of data blocks.

5. The method according to claim 3, wherein the storing of the number of data blocks and the corresponding determined check values in the memory unit of the computing unit includes:
   storing the number of data blocks into at least one memory area of the memory unit at a first memory area address;
   storing the corresponding determined check values in the at least one memory area of the memory unit at a second memory area address.

6. The method according to claim 1, wherein:
   (i) the removing of the first data from the check value associated with the data block includes:

determining a first characteristic value including a hash value of the first data, changing the check value associated with the data block, depending on the at least one determined first characteristic value; and/or (ii) wherein the adding of the second data to the check value associated with the data block includes:

determining a second characteristic value including a hash value of the second data, and changing the check value associated with the data block, depending on the at least one determined second characteristic value.

7. The method according to claim 1, wherein, in the safe operating mode of the computing unit, the access takes place using one or more of the following instructions of different instruction categories:

a write instruction of a first instruction category to write data into a particular data block of the number of data blocks without changing a check value associated with the particular data block, or to write data into a particular data block that is not part of the number of data blocks;

a read instruction of the first instruction category to read data from a particular data block of the number of data blocks without changing a check value associated with the particular data block, or to read data from a particular data block that is not part of the number of data blocks;

a write instruction of a second instruction category to write data into a particular data block of the number of data blocks without changing a check value associated with the particular data block;

a read instruction of the second instruction category to read data from a particular data block of the number of data blocks and to change in a first manner a check value associated with the particular data block;

a write instruction of a third instruction category in order to write data into a particular data block of the number of data blocks and to change in a second manner a check value associated with the particular data block;

a read instruction of the third instruction category to read data from a particular data block of the specified number of data blocks and to change in a third manner a check value associated with the particular data block.

8. The method according to claim 1, wherein: in the safe operating mode, the reading of the data from the data block and the writing of the data into the data block based on the access being a read access, and the reading of the first data from the data block and the writing of the second data into the data block based on the access including a write access, are carried out according to a first time requirement; and in the safe operating mode, the removing of the first data from the check value associated with the data block and the adding of the second data to the check value associated with the data block based on the access including a write access are carried out according to a second time requirement.

9. The method according to claim 1, further comprising: based on the access being a write access:

reading the check value associated with the data block, and storing the read check value together with information regarding the data block in a further memory unit including a volatile memory unit within a processor unit of the computing unit, the volatile memory unit being a cache memory.

10. The method according to claim 1, further comprising: creating a table including a memory address of a first data block of the number of data blocks and a memory address of a first check value, directly behind a last data block of the number of data blocks;

wherein, in the safe operating mode, the accessing of the data block includes:

checking whether the memory address of the data block is stored in the table.

11. The method according to claim 1, wherein the checking of the check value associated with the data block is carried out in response to a check instruction being called and/or according to a specified frequency and/or according to a specified sequence.

12. The method according to claim 1, wherein the computing unit has a plurality of units that can access the data block, wherein accesses of the plurality of units to the data block are synchronized.

13. A computing unit, comprising: a processor based on a RISC-V instruction set architecture; wherein the computing unit is configured to access a data block of a number of data blocks, stored in a memory unit of the computing unit, the computing unit configured to: activate a safe operating mode of the computing unit; access, in the safe operating mode of the computing unit, the data block, based on the access being a read access, read data from the data block and subsequently write the data into the data block, based on the access including a write access, read first data from the data block, remove the first data from a check value associated with the data block, write second data into the data block, add the second data to the check value associated with the data block, and check the check value associated with the data block.

14. A non-transitory machine-readable storage medium on which is stored a computer program accessing a data block of a number of data blocks, stored in a memory unit of a computing unit, the computer program, when executed by the computing unit, causing the computer unit to perform the following steps:

activating a safe operating mode of the computing unit;

accessing, in the safe operating mode of the computing unit, the data block;

based on the access being a read access, reading data from the data block and subsequently writing the data into the data block;

based on the access including a write access, reading first data from the data block, removing the first data from a check value associated with the data block, writing second data into the data block, adding the second data to the check value associated with the data block; and checking the check value associated with the data block.

* * * * *